United States Patent [19]
Bobbitt

[11] 3,792,349

[45] Feb. 12, 1974

[54] DUAL CHANNEL, DUAL POTENTIAL OPEN-CIRCUIT TEST APPARATUS

[75] Inventor: Charles R. Bobbitt, Phoenix, Ariz.

[73] Assignee: Honeywell Information Systems Inc., Waltham, Mass.

[22] Filed: Oct. 25, 1972

[21] Appl. No.: 300,605

[52] U.S. Cl. .................................................. 324/51
[51] Int. Cl. ........................................... G01r 31/02
[58] Field of Search ....... 324/51, 133, 140, 72.5, 66

[56] References Cited
UNITED STATES PATENTS 3,617,879   11/1971   Mugnier........................ 324/133 X
3,699,438   10/1972   Webb............................. 324/51 X
3,495,172    2/1970   Davis................................. 324/51

*Primary Examiner*—Gerard R. Strecker
*Attorney, Agent, or Firm*—James A. Pershon; Edward W. Hughes

[57] ABSTRACT

A detector network for the indentification of discontinuities in integrated circuit lead connections in the presence of two different potentials such as positive or negative test pulses or different steady state voltages.

3 Claims, 3 Drawing Figures

3,792,349

DUAL CHANNEL, DUAL POTENTIAL OPEN-CIRCUIT TEST APPARATUS

BACKGROUND OF THE INVENTION

Plastic encapsulated integrated circuits are prone to intermittent open circuit conditions at bonding connections because the connecting leads are bonded or embedded in plastic which expands and contracts with temperature changes.

The present invention comprises a detector circuit which monitors the terminals of the integrated circuit in the presence of steady state or probing positive and negative pulses, detects the lead discontinuities and generates a signal or sets an error latch circuit which identifies the open lead condition.

DESCRIPTION OF THE PRIOR ART

Heretofore oscilloscopes have been utilized to monitor circuit conditions of an encapsulated integrated circuit when the encapsulated device was heated by a hotplate positioned in a test box and tested under one or more temperature conditions.

The oscilloscope method is slow and cumbersome, especially when applied to the procedures employed in connection with equipment for inspecting a large number of devices at many different temperature levels.

SUMMARY OF THE INVENTION

Therefore, in accordance with the invention claimed, a new detector network is provided for detecting intermittent bond connections at integrated circuit terminals which may be pulsed at high speeds and used in combination with other like circuits to interrogate many circuits at one time. To accommodate the directional characteristics of integrated circuit elements terminated at the bonded connections, two different potentials such as, for example, positive and negative potentials or probing pulses are employed in the testing procedure.

It is, therefore, an object of this invention to provide an electronic detections circuit to detect the presence of an open connection in an integrated circuit in the presence of a probing pulse.

Another object of this invention is to provide a detector circuit capable of detecting a circuit dicontinuity in the presence of two different potentials such as a positive or a negative probing pulse.

A further object of this invention is to provide a detection circuit which can function at a high repetition rate to permit rapid and repeated test operations.

A still further object of this invention is to provide a detection circuit which may be readily activated under high speed operating conditions to permit selection of a desired test terminal.

A still further object of this invention is to provide a detection circuit which has the capability of setting an error latch indicator to identify the location of a detected open lead connection.

Further objects and advantages of the invention will become apparent as the following description proceeds and the features of novelty which characterize this invention will be pointed out with particularity in the claims annexed to and forming part of this specification.

BRIEF DESCTIPTION OF THE DRAWINGS

The present invention may be more readily described by reference to the accompanying drawings, in which.

DESCRIPTION OF THE PREFERRED EMBODIMENT

Figure 1:
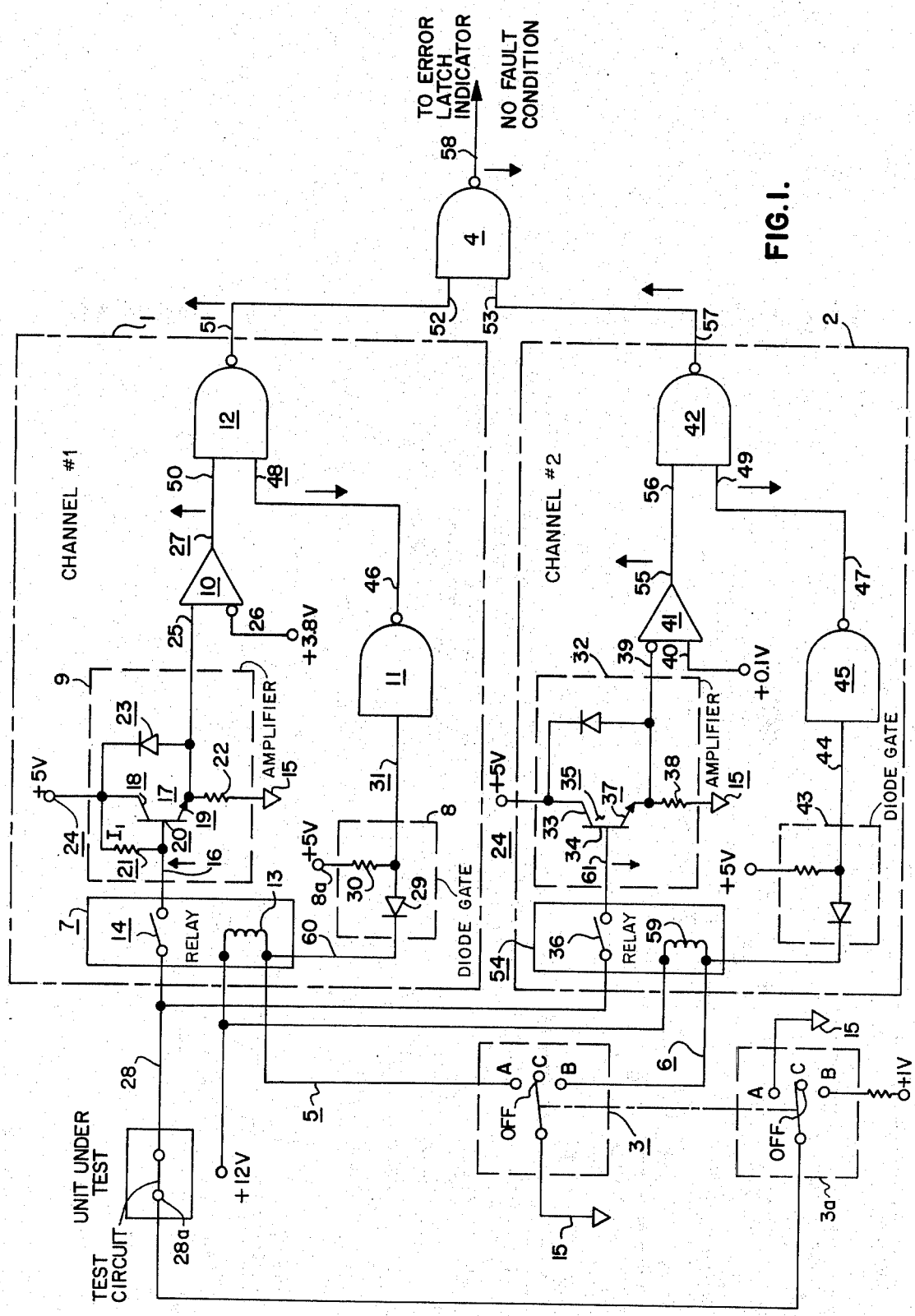
FIG. 1 is a schematic drawing of the preferred embodiment of the detector network.

Referring more particularly to the drawing by characters of reference, FIG. 1 discloses the detector network comprising an upper channel 1 and a lower channel 2, a channel selector switch 3, a switch 3a for controlling the potential at one end of the circuit being tested and an output gate 4.

Channel selector switch 3 and control switch 3a are three-position synchronized switches with positions A, B and an "Off" position C. When switch 3 is set in position A, channel is selected by connecting input line 5 to ground. When set on position B, switch 3 selects channel 2 by connecting input line 6 to ground. When switch 3 is set on the "Off" position C, neither channel 1 nor channel 2 is selected.

Channel 1 is comprised of an enabling relay 7, a diode gate 8, a biased amplifier 9, a comparator 10 and two NAND gates 11 and 12.

Relay 7 has a coil 13 and a contact mechanism 14 which is normally in the open position when coil 13 is not energized. The upper end of coil 13 is connected to a positive voltage source shown as "+12V." Coil 13 is energized by connecting its lower end to ground 15 through input line 5 and switch 3 when switch 3 is set in position A. When coil 13 is thus energized its contacts 14 are closed, connecting input terminal 16 of amplifier 9 to the unit under test.

Amplifier 9 includes resistors and 22, diode 23 and transistor 17. When contacts 14 of relay 7 are open, a current $I_1$ flows from the +5V source 24 through resistor 21 into base 20 of transistor 17. Current $I_1$ is of sufficient amplitude to turn on transistor 17 or to set it in a near saturated condition, i.e., its anode-to-cathode voltage will be in the region of one-half volt or less. The emitter 19 of transistor 17 and hence input terminal 25 of comparator 10 are approximately 4.5 volts above ground. When contacts 14 of relay 7 are closed, the condition of transistor 17 is dependent upon the voltage present on line 28, which is connected to the unit under test. A negative or low positive potential on line 28 will tend to turn transistor 17 off so that the potential at its emitter 19 will also be at or near ground potential. If line 28 is positive or if line 28 is terminated in a high impedance such as an open circuit at the unit under test, transistor 17 will then be in the "On" condition as in the case when contacts 14 of relay 7 were open. Amplifier 9 thus delivers a high or a low potential to input terminal 25 of comparator 10 depending upon the potential on input line 28. In order for a potential to exist on line 28 when continuity exists in the test circuit under test, end 28a of the test circuit is connected to ground when selector switch 3 is in position A. This is accomplished by the control switch 3a which is synchronized with switch 3, as shown in FIG. 1.

Comparator 10 is a type of integrated circuit which compares two input potentials and delivers at its output terminal a voltage level indicating which of the two potentials is more positive. Comparator 10 has two input terminals 25 and 26 which are connected to the two potentials which are to be compared, and it has an output terminal 27. Input terminal 25 is known as a "non-inverting" input terminal because an input at this terminal which is more positive than the potential at the other input terminal will cause the output terminal 27 to be at a relatively high positive voltage with respect to ground. Input terminal 26 is shown with a small "bubble" at its entrance and is known as an "inverting" input terminal because a signal at this input terminal which is more positive than the signal at the other input terminal causes the output at terminal 27 to be at a relatively low positive potential or at a potential which is negative with respect to ground. The comparator is shown as typically represented and the discussion of its operation as outlined above is amplified by many texts and handbooks which are readily available. Specifications for a typical comparator are given on pages 3-91 of *The Integrated Circuits Catalog for Design Engineers*, First Edition, published by Texas Instruments, Inc. See also "Operational Amplifier," *RCA Integrated Circuit Fundamentals*, Radio Corporation of America, 1966 (Chapter on "Integrated-Circuit Operational-Amplifier Configuration" beginning on page 60).

Diode gate 8 includes a diode 29 and a resistor 30. The input terminal 60 of diode gate 8 is at the cathode of diode 29; the output terminal of the gate is at the anode of diode 29. When input line 5 is grounded through position A of switch 3, the cathode of diode 29 is at ground potential. Current flowing from the +5V source 8a through resistor 30 and through diode 8 from anode to cathode raises the anode potential to approximately 0.6 volts above ground. The output of the gate for this condition is thus approximately 0.6 volts as delivered to input terminal 31 of NAND gate 11. When input line 5 is open, the cathode of diode 29 is connected to a +12 volt potential through coil 13 of relay 7. The cathode of diode 29 is thus more positive than the anode, and the diode is said to be reverse biased. Under this condition, substantially no current flows through the diode or through resistor 30 and the anode of diode 8 as well as the input terminal 31 of gate 11 are at or near the +5 volt potential.

NAND gates 11 and 12 are commoy used logic circuits having one or more input terminals and one output terminal. If any or all of the input terminals of one of these gates are low (a volt or less positve with respect to ground), the output terminal will be high (2 volts or more positive with respect to ground). If all input terminals are high (2 volts or higher), the output terminal will be low (less than 1 volt). A NAND gate in which only one input terminal is employed is called an inverter. In this case the output will be low when the input is high and the output will be high when the input is low.

For description of NAND (or NOT AND) gates see Digital Computer Fundamentals, Thomas C. Bartee, McGraw Hill Book Co. 1960, pp. 106-110 or Computer Basics, vol. 6, pp. 101-102, Bobbs Merrill Co., Inc. 1962.

With the exception of amplifier 32, the major network elements of channel 2 are the same as those employed in channel 1. Amplifer 32 is the same as amplifier 9 except that amplifier 32 has no resistor connected between collettor 33 and base 34 of its transistor 35. In this case, there is no source of base drive current when relay contact 36 of relay 54 is open, and transistor 35 is thus turned off so that its emitter 37 is near ground potential. The same contions are true when contact 36 is closed and input line 28 terminates in a high impedance or connects to a low positive or to a negative voltage. A positive signal level on line 28 with contact 36 closed supplies drive current into base 34, causing an amplifier current to flow from collector 33 to emitter 37 of transistor 35. This positive signal level occurs by switch contact 3a in position B connecting end of 8a of the test circuit to approximately a +1 volt source. This same amplified current flowing through resistor 38 to ground terminal 15 produces a voltage drop across resistor 38 and sets a voltage level at emitter 37 that is within approximately 0.6 volts as positive as the signal on line 28.

Channel 2 differs from channel 1 in a second respect: the output of amplifier 9 of channel 1 is connected to the non-inverting input terminal 25 of comparator 10, whereas the output of amplifier 32 of channel 2 is connected to the inverting input terminal 39 of comparator 41.

Output gate 4 is identical to gates 12 and 42. Operation of the detector circuit and signal levels at points throughout the network are dependent upon the position of switch 3 and upon signals present on input line 28.

The following conditions exist when channel selector switch 3 is in the "Off" position: The input terminals of diode gate 8 of channel 1 and of an identical diode gate 43 of channel 2 are both at a positive 12 volts. The output terminals 31 and 44 are thus at or near +volts. Output terminals 46 and 47, respectively, of gates 11 and 45 are thus both low, as are the corresponding input terminals 48 and 49, respectively, of gates 12 and 42. This condition is represented by the arrows pointing downward at input terminals 48 and 49.

Because contact 14 of relay 7 is open when selector switch 3 is in the "Off" position, transistor 17 is "On" and a positive level exists at input terminal 25 of comparator 10. Because this positive level at non-inverting input terminal 25 is more positive than the +3.8 volts present at inverting input terminal 26, the output terminal 27 of comparator 10 is also high, as indicated by the arrow pointing upward on the line connecting output terminal 27 of comparator 10 with input terminal 50 of gate 12. Because one of the input terminals (terminal 48) of gate 12 is low, the output terminal 51 of gate 12 is high, as indicated by the arrow pointing upward on the line connecting output terminal 51 of gate 12 to input terminal 52 of gate 4.

Contact 36 of relay 54 is also open when selector switch 3 is in the "Off" position. Transistor 35 of amplifier 32 is thus in the "Off" condition anthe input terminal 39 of comparator 41 is thus substantially at 0 volts. Because the voltage at inverting input terminal 39 of comparator 41 is lower than the positive 0.1 volt reference connected to non-inverting input terminal 40, the output of comparator 41 at terminal 55 is high, as indicated by te arrow pointing upward on the line connecting output terminal 55 of comparator 41 to input terminal 56 of gate 42. Because input terminal 49 of gate 42 is low, the output terminal 57 of gate 42 is high, as indicated by the arrow pointing upward on the line connecting output terminal 57 of gate 42 to input terminal 53 of gate 4.

Because both input terminals 52 and 53 of gate 4 are high, output terminal 58 of gate 4 is low, as indicated by the arrow pointing downward. A low level on line 58 leading to the error latch and indicator is a "no fault" condition and will not set the error latch.

Figure 2:
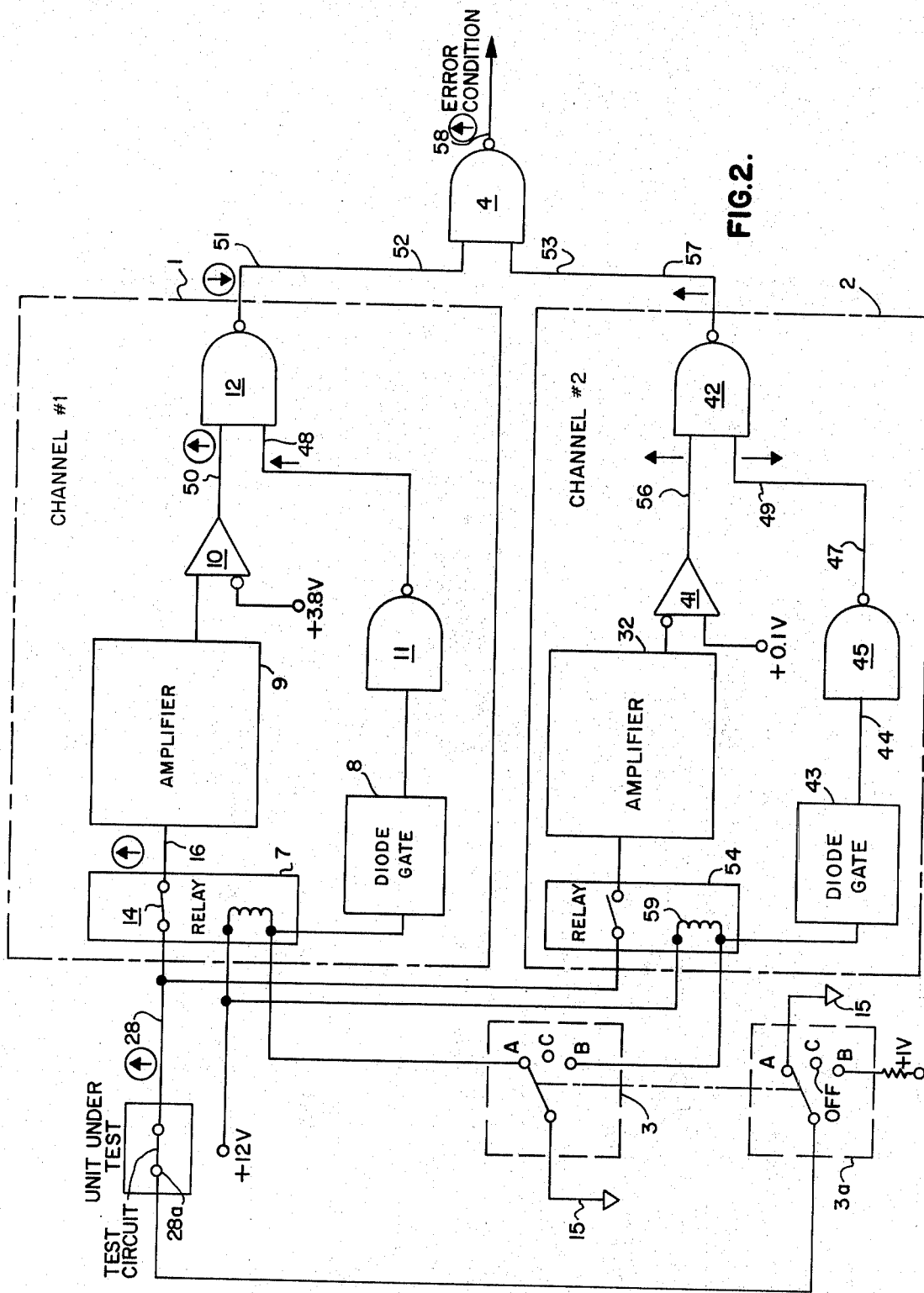
FIG. 2 is a partial view of the schematic drawing of the preferred embodiment of the detector network shown in FIG. 1 with relays set to enable the upper channel of the detector. The network is shown with circled arrows representing signal levels in the presence of abnormal conditions at the unit under test.

FIG. 2 shows signal levels existing with selector switch 3 set in position A to enable channel 1. When selector switch 3 is in position A, coil 59 of relay 54 is not energized and signal levels for channel 2 are the same as described above for selector switch 3 in the "Off" position. The signal at input 53 of gate 4 is thus high, as indicated by the arrow pointing upward on the line leading to terminal 53.

When switch 3 is moved from the "Off" position to position A, the signal level at the input of diode gate 8 switches from a high level (+12 volts) to a low level (ground). A corresponding reversal (from low to high) occurs in the signal level at input terminal 48 of gate 12 as indicated by the arrow pointing upward.

For the open condition of contacts 14 of relay 7 the signal level at input terminal 16 of amplifier 9 was high. For the closed condition of contacts 14 as shown in FIG. 2 and with continuity to ground or to a negative potential through a normal lead connection in the unit under test, the signal level at input terminal 16 reverses to a low level. A corresponding reversal of the signal at input terminal 50 of gate 12 results as indicated by the arrow pointing downward. Signal levels at outputs of gates 12, 42 and 4 for these conditions are indicated by the remaining arrows and may be derived on the basis of earlier explanations of gate operating characteristics. Again, the arrow pointing downward at output terminal 58 indicates NO FAULT in the unit under test.

In FIG. 2, which represents the same circuit shown in FIG. 1 with details removed for the sake of clarity, some of the arrows pointing upward or downward are different than in FIG. 1. The circled arrows indicate signal levels in that part of channel 1 which are affected by conditions in the unit under test. More specifically, the circled arrows in FIG. 2 indicate signal levels corresponding to fault conditions in the unit under test.

If conditions in the unit under test are not normal, i.e., if the lead connection at the selected terminal of the unit under test is open, the signal level at input terminal 16 of amplifier 9 will be high.

Figure 3:
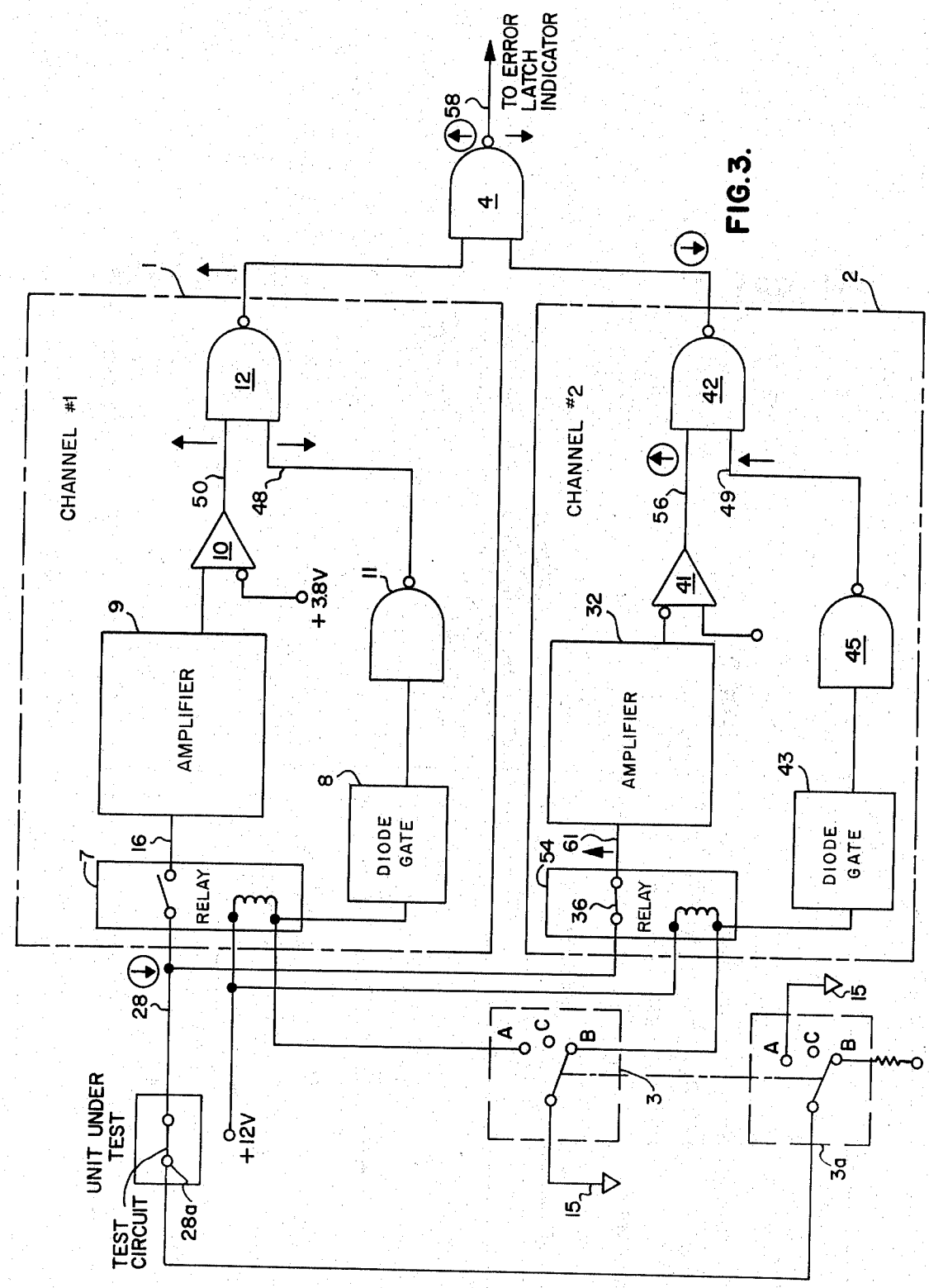
FIG. 3 is a partial view of a schematic drawing of the preferred embodiment of the detector network shown in FIG. 1 with relays set to enable the lower channel of the detector network shown with circled arrows representing signal levels in the presence of abnormal conditions at the unit under test.

FIG. 3 shows signal levels present throughout the detector network when selector switch 3 is set in position B, which energizes relay 54, closing contacts 36 as shown. The arrows pointing upward and downward again represent high and low signal levels prevailing in the case of normal or abnormal conditions at the unit under test. Circled arrows indicate a "fault" or open-circuit condition at the unit under test.

On the basis of the foregoing explanations of circuit operation, it is seen that a negative signal at input terminal 16 of amplifier 9 of channel 1 corresponds to a normal condition at the unit under test, whereas a positive signal at input terminal 61 of amplifier 32 of channel 2 corresponds to a normal condition at the unit under test. It is this feature which enables the detector network to detect faults with either positive or negative probing pulses or two different potentials of like or different polarities. Selection of the appropriate channel is accomplished by switch 3 when it is set in position A or position B.

Although but one embodiment of the invention has been illustrated and described, it will be obvious to one skilled in the art that various changes and modifications may be made without departing from the spirit of the invention and scope of the appended claims.

What is claimed is:

1. A systm for converting information received from a circuit under test energized by two different voltage potentials into indicator signals, said system comprising:

a pair of test channels, a channel selector switch, an output gate, said selector switch being arranged to selectively connect a circuit under test between either of the two different potentials and either of said channels, said first channel comprising a first amplifier, having an input terminal connected to the circuit under test with one potential applied thereto by said selector switch and an output terminal connected to one terminal of a first comparator, a second gate having a first input terminal connected to an output terminal of said comparator, a first diode gate rendered conductive when said selector switch connects said first channel to the circuit under test and having an output terminal connected to a second input terminal of said second gate to permit conduction of said second gate according to the first input terminal of said second gate, said second gate having an output terminal connected to a first terminal of said output gate, said first comparator having a second input terminal connected to a source of potential which controls the polarity of the output signal of said first comparator, said second channel comprising a second amplifier having an input terminal connected to the circuit under test with the second potential applied thereto by said selector switch and an output terminal connected to one terminal of a second comparator, a third gate having a first input terminal connected to an output terminal of said second comparator, a second diod gate rendered conductive when said selector switch connects said second channel to the circuit udder test and having an output terminal connected to a second input terminal of said third gate to permit conduction of said third gate according to the first input terminal of said third gate, said third gate having an output terminal connected to a second terminal of said output gate, said second comparator having a second input terminal connected to a source of potential which controls the polarity of the output signal of said second comparator, said first channel transmitting a given signal to the first input terminal of said output gate when said selector switch connects the circuit under test to said first channel and continuity exists in the circuit under test, said second channel transmitting a given signal to the second input terminal of said output gate when said selector switch connects the circuit under test to said second channel and continuity exists in the circuit under test, said first diode gate rendered nonconductive when the circuit under test is connected via said selector switch to said second channel, said second diode gate rendered nonconductive when the circuit under test is connected via said selector switch to said first channel, said output gate transmitting an error signal when continuity does not exist in the circuit under test.

2. The system set forth in claim 1 wherein:

said selector switch is provided with an OFF position and when said selector switch is in said OFF position said first and second channels each transmit to said output gate signals indicative of an unenergized condition, said output gate transmitting an output signal indicative of a fault condition.

3. The system set forth in claim 1 wherein:

said selector switch simultaneously connects one end of the circuit under test to either of said first and second potentials and the other end of the circuit under test to a different potential.

* * * * *